United States Patent [19]
Kita et al.

[11] 4,175,216
[45] Nov. 20, 1979

[54] INTERCOM CALLING APPARATUS IN A KEY TELEPHONE SYSTEM

[75] Inventors: Gunzo Kita; Koichi Sekiguchi, both of Tokyo, Japan

[73] Assignee: Iwatsu Electric Co., Ltd., Tokyo, Japan

[21] Appl. No.: 897,286

[22] Filed: Apr. 17, 1978

Related U.S. Application Data

[63] Continuation-in-part of Ser. No. 726,230, Sep. 24, 1976, abandoned.

[30] Foreign Application Priority Data

Oct. 13, 1975 [JP] Japan .................................. 50/123062

[51] Int. Cl.² ............................................. H04M 1/72
[52] U.S. Cl. .............................. 179/99 A; 179/18 BF
[58] Field of Search ............ 179/1 H, 18 AD, 18 BF, 179/37, 99

[56] References Cited

U.S. PATENT DOCUMENTS

| | | | |
|---|---|---|---|
| 3,872,261 | 3/1975 | Shinoi et al. | 179/99 |
| 3,904,834 | 9/1975 | Shinoi et al. | 179/99 |
| 3,927,278 | 12/1975 | Tsutsumi et al. | 179/99 |
| 4,001,517 | 1/1977 | Bidlack et al. | 179/99 |
| 4,002,857 | 1/1977 | Herlacher | 179/99 |
| 4,032,724 | 6/1977 | Matheny | 179/99 |
| 4,079,212 | 3/1978 | Sasai | 179/99 |

*Primary Examiner*—Kathleen H. Claffy
*Assistant Examiner*—Randall P. Myers
*Attorney, Agent, or Firm*—Oblon, Fisher, Spivak, McClelland & Maier

[57] ABSTRACT

An intercom calling apparatus in a key telephone system including a page switch for switching the transmitter from a talking circuit network to an intercom calling path while a contemporaneous call on a central office line is held by the series combination of a resister and a varistor forming a parallel circuit with the transmitter in the talking circuit network.

3 Claims, 3 Drawing Figures

INTERCOM CALLING APPARATUS IN A KEY TELEPHONE SYSTEM

CROSS-REFERENCE TO RELATED APPLICATIONS

This application is a Continuation-In-Part application for application Ser. No. 726,230 filed Sept. 24, 1976 and now abandoned.

BACKGROUND OF THE INVENTION

1. Field of the Invention

This invention relates to a key telephone system and more particularly to an intercom calling apparatus in such a system.

2. Description of the Prior Art

In a conventional key telephone system, when a person receives a telephone call on a central office line (hereinafter called CO line or outside line) and is requested to call a third party, he must first put the call on hold by depressing the hold pushbutton in his key telephone set (or called subset), and thereupon call the designated third party by means of intercom calling.

Referring to FIG. 1, the above-mentioned conventional key telephone system will be explained. Let it be assumed that one person receives a telephone call on an outside line by depressing the pushbutton of switch LK1 and lifting up the handset in his subset, such that contacts with switch LK1 and switchhook HS1, HS2 are changed from the normal position to its opposite position. To call the designated third party by intercom, he must first depress a hold pushbutton to open the switch $LK_n$, the call on outside line is held by a CO line control circuit through an inside line, which line control circuit usually performs the functions of line busy supervision, line holding control, and ringing detection. Then he must depress the intercom pushbutton to change switch $LK_n$ to its opposite position to call the third party. The intercom caller's voice is then transmitted to the amplifier D in a key service unit via an intercom speech path, and thence to the amplifier E of a loudspeaker SP in each key telephone set via a calling signal line. The loudspeakers SP of each key telephone set of the key telephone system then sound simultaneously to call the third party. Thus, the switch $LK_n$ is used not only for initiation of the above described intercom calling apparatus, but also during the transmittal of the intercom message.

The above-described prior art intercom calling apparatus in a key telephone system suffers from the following disadvantages:

(1) when a calling subscriber calls a called party over a CO line and requests the called party to call a third party by intercom during the conversation over the CO line, the called party must first put the subscriber on hold;

(2) the called party cannot originate the intercom call if the intercom line circuit is already in use, because the contacts of a relay A are operated when the called party answering detector in the key service unit detects the intercom speech; and, (3) the called party must depress an intercom pushbutton to close the contacts of a switch for connecting the transmitter of his subset to the intercom speech path, in addition to depressing the hold pushbutton.

SUMMARY OF THE INVENTION

Accordingly, it is an object of the present invention to provide a new and improved intercom calling apparatus in a key telephone system by which a called party can call a designated third party without putting the calling party on hold by depressing a hold pushbutton during a telephone call or telephone conversation on a CO line.

It is an other object of the present invention to provide an intercom calling apparatus in a key telephone system utilizing a page switch in a key telephone set.

It is a further object of the present invention to provide an intercom calling apparatus in a key telephone system utilizing a varistor for automatically controlling volume of the transmitter in the talking circuit network to hold the incoming call from the calling subscriber.

Briefly stated, in accordance with the present invention the foregoing and other objects are in one aspect attained by the provision of an intercom calling apparatus for originating an intercom call in a key telephone system including a plurality of key telephone sets, each having a transmitter, a talking circuit network for telephone conversation over a CO line, and a loudspeaker circuit. The intercom calling apparatus includes a pair of a two position page switches, means for electrically connecting the transmitter to the talking circuit network when the page switch is in a first position, means for electrically connecting the transmitter to the loudspeaker circuit in each of said key telephone sets when the page switch is in a second position, and means for holding the connection of the talking circuit network to a CO line by the series combination of a resistor and a varistor forming a parallel circuit with the transmitter in the talking circuit network at the same time the page switch is switched to the second position.

BRIEF DESCRIPTION OF THE DRAWINGS

Various other objects, features and attendant advantages of the present invention will be more fully appreciated as the same becomes better understood from the following detailed description when considered in connection with the accompanying drawing, wherein.

DETAILED DESCRIPTION OF THE PREFERRED EMBODIMENTS

Figure 2:
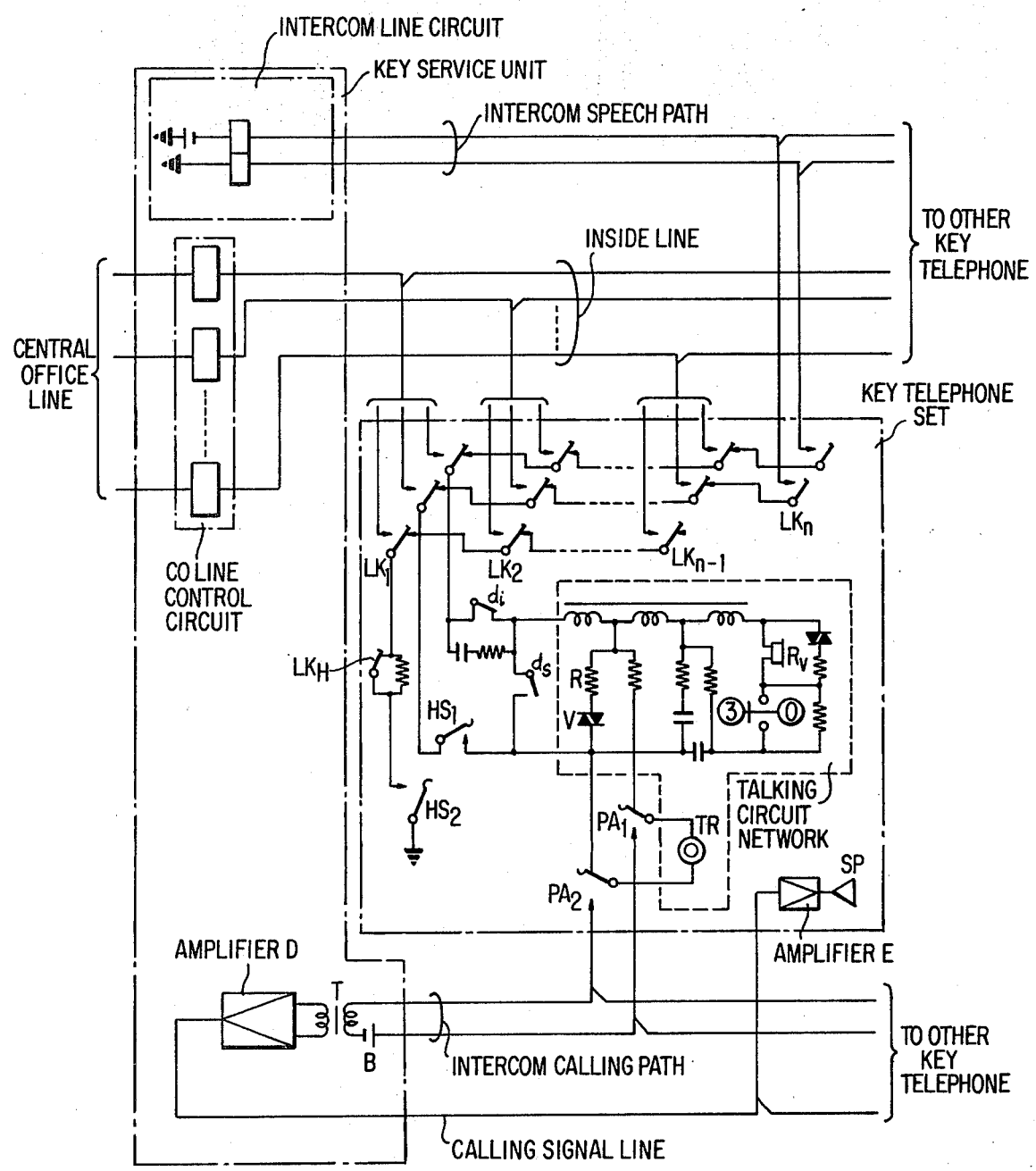
FIG. 2 shows an intercom calling apparatus in a key telephone system of the present invention.

Referring now to the drawings wherein like reference characters refer to identical or corresponding parts, and more particularly to FIG. 2 thereof there is shown a first embodiment of an intercom calling apparatus in a key telephone system.

Each outside CO line is connected through the CO line control circuit in a key service unit to each of the switches $LK_1$-$LK_{n-1}$ by means of an inside line. The inside line herein described generally include a pair of talking path lines identical to input CO lines, a control line for holding an incoming telephone call or telephone conversation on an outside CO line, and a line for activating a subset busy lamp. However, as is seen in FIG. 2, only the pair of talking path lines and a control line are shown connected to the CO line control circuit to the key set switches $LK_1$-$LK_{n-1}$. The key telephone system includes a plurality of key telephone sets and a key service unit. Indicated by broken line is a talking circuit network of a key telephone set which includes a transmitter TR. HS is the handset switchhook and $d_i$, $d_s$ are dial contacts. $LK_1$-$LK_{n-1}$ are pushbutton switches for selecting a central office line. $PA_1$ and $PA_2$ are the contacts of page switch for disconnecting the transmitter TR from the talking circuit network in the key telephone set and for connecting the transmitter TR to the intercom calling path, as well as the battery B and the primary winding of the transformer T in the key service unit. The secondary winding of the transformer T is connected to the amplifier D whose output is connected via the calling signal line to each loudspeaker circuit, which includes the amplifier E and the loudspeaker SP, in a plurality of key telephone sets.

In operation, let it be assumed that a person receives a telephone call on the CO line No. 1 by depressing the pushbutton of switch $LK_1$ and lifting up the handset in his subset, and that he is requested to call a third party.

The contacts of the switch $LK_1$ are thereby connected from the normal position as shown in FIG. 2 to the opposite position, and also thereby the switch $HS_1$, $HS_2$ is shut. The talking path corresponding to the CO line No. 1 of an inside line is connected to the talking circuit network, and the key set is thus enabled to take a telephone conversation.

When the called party operates the page switch in his subset to call the designated third party, thereby the transmitter TR connection is changed to the intercom calling path from the talking circuit network. Thereupon, the connecting state on the CO line is held by means of a resister R and a varistor V forming a parallel circuit with the transmitter TR, which is normally the means for controlling the flow of d.c. current through the transmitter TR from the central office according to the value of d.c. current. The varistor V does not interfere with a normal telephone conversation on the CO line. In the meantime, the transmitter TR switched to the intercom calling path is activated by the battery B in the key service unit. Accordingly, the called party's voice is transmitted to the intercom calling path through the contacts $PA_1$, $PA_2$, which are switched to the second position, and then is applied to the intercom amplifier D through the transformer T in the key service unit. The output of the intercom calling amplifier D is amplified by each amplifier E in a plurality of key telephone sets such that the loudspeaker SP connected to the output of amplifier E. Since each loudspeaker circuit of each key telephone set in the key telephone system is connected to the intercom calling signal line, each loudspeaker is activated during transmittal of an intercom call. Accordingly, one person requested to call can call the third party by merely changing the page switch without cutting off the connecting state on the CO line.

Figure 1:
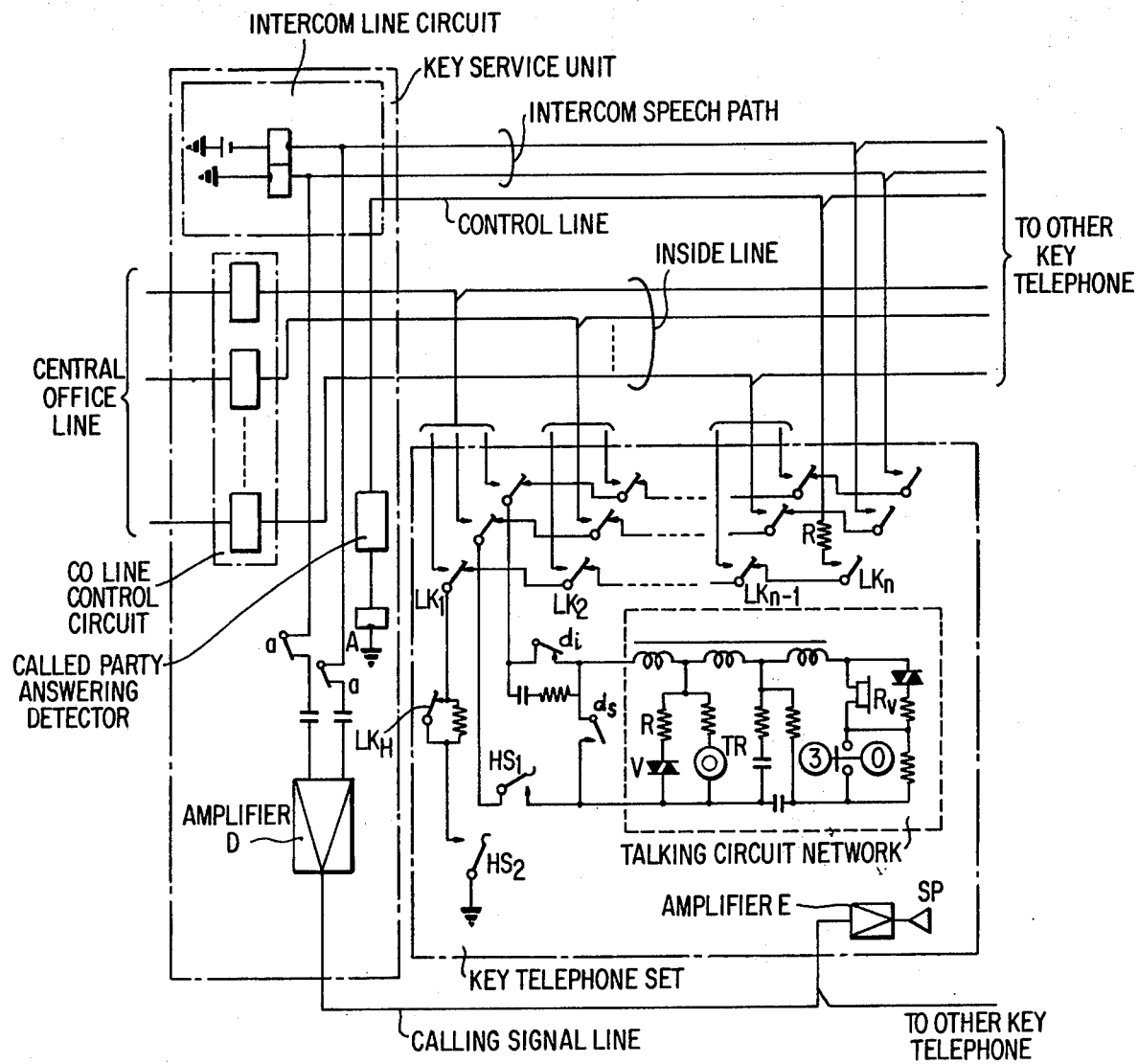
FIG. 1 shows a conventional intercom calling apparatus in a key telephone system.
Figure 3:
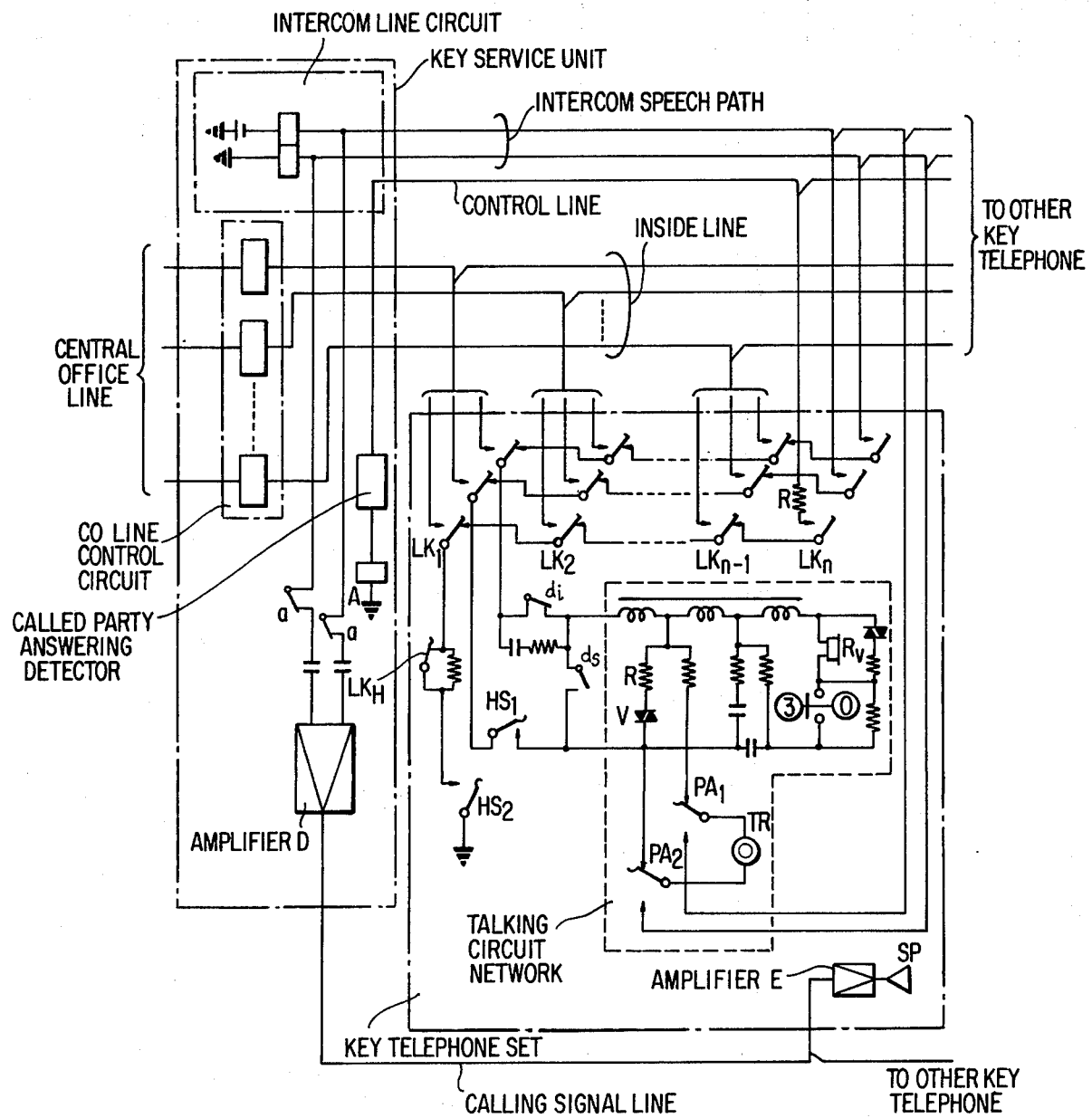
FIG. 3 shows another embodiment of the present invention.

Referring to FIG. 3, there is shown a second embodiment of the present invention. This embodiment differs from the prior art circuit shown in FIG. 1 by the addition of the contacts $PA_1$ and $PA_2$ of a page pushbutton switch for disconnecting the transmitter TR from the talking circuit network in the key telephone set and for connecting the transmitter TR to the intercom speech path. The connection of the transmitter TR via the calling signal line to amplifier D whose output is connected to each loudspeaker circuit is then made via the intercom speech path as in the prior art.

In operation, let it be assumed that a called party receives a telephone call on the CO line No. 1 by depressing the pushbutton of switch $LK_1$ and lifting up the handset in his subset, and he is requested to call a third party.

The contacts of the switch $LK_1$ is thereby connected from the normal position as shown in FIG. 3 to its opposite position, and also thereby the switch $HS_1$, $HS_2$ is shut. The talking path corresponding to the CO line No. 1 of an inside line is connected to the talking circuit network, and telephone conversation is enabled.

When the called party operates the page switch in his subset for calling the designated third party, thereby the transmitter TR connection is changed to the intercom speech path from the talking circuit network. Thereupon, the connecting state on the CO line is held by means of a resister R and varistor V forming a parallel circuit with the transmitter TR, which is normally the means for controlling the flow of d.c. current through the transmitter TR from the central office according to the value of the d.c. current. The varistor V does not interfere with a normal telephone conversation on a CO line.

The intercom caller's voice is transmitted to the amplifier D in a key service unit via intercom speech path, and the output of the amplifier D is amplified by each amplifier E in a plurality of key telephone sets such that each loudspeaker SP connected to each amplifier E is again energized.

Accordingly, a called party can use the intercom calling apparatus of FIG. 3 to call a third party by merely switching the page switch without cutting off the connecting state on a CO line, as well as the embodiment shown in FIG. 2.

Obviously numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a key telephone system wherein a plurality of key telephone sets are connected to a central office via a central office line, each of said key telephone sets having a transmitter, a talking circuit network, and a loudspeaker circuit for signalling an intercom call, and wherein each of said loudspeaker circuits signals said intercom call, an intercom calling apparatus comprising:

a two-position page switch;
means for electrically connecting the transmitter to the talking circuit network when the page switch is in a first position;
means for electrically connecting the transmitter to the loudspeaker circuit in each of said key telephone sets when the page switch is in a second position; and
means for holding the connection of the talking circuit network with a central office line by a series combination of a resistor and a varistor forming a parallel circuit with the transmitter in the talking circuit network at the same time the page switch is changed to the second positon.

2. The intercom calling apparatus recited in claim 1, wherein the connecting means to the loudspeaker comprises:

an intercom calling path having a d.c. power source for activating the transmitter; and
means for picking up a voice signal in the intercom calling path to energize the loudspeaker.

3. The intercom calling apparatus as recited in claim 2, wherein the voice signal picking up means comprises: a transformer.

* * * * *